(12) United States Patent
Lee et al.

(10) Patent No.: US 10,506,586 B2
(45) Date of Patent: Dec. 10, 2019

(54) SLOT FORMAT INDICATOR (SFI) AND SLOT AGGREGATION LEVEL INDICATION IN GROUP COMMON PDCCH AND SFI CONFLICT HANDLING

(71) Applicant: QUALCOMM Incorporated, San Diego, CA (US)

(72) Inventors: Heechoon Lee, San Diego, CA (US); Wanshi Chen, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/927,716

(22) Filed: Mar. 21, 2018

(65) Prior Publication Data

US 2018/0279304 A1   Sep. 27, 2018

Related U.S. Application Data

(60) Provisional application No. 62/476,634, filed on Mar. 24, 2017.

(51) Int. Cl.
| | |
|---|---|
| *H04W 72/04* | (2009.01) |
| *H04W 72/12* | (2009.01) |
| *H04L 5/00* | (2006.01) |
| *H04W 84/04* | (2009.01) |

(52) U.S. Cl.
CPC ....... *H04W 72/0446* (2013.01); *H04L 5/0094* (2013.01); *H04W 72/042* (2013.01); *H04W 72/12* (2013.01); *H04L 5/0048* (2013.01); *H04L 5/0053* (2013.01); *H04W 72/1289* (2013.01); *H04W 84/042* (2013.01)

(58) Field of Classification Search
CPC ........... H04W 72/0446; H04W 84/042; H04W 72/12; H04W 72/042
See application file for complete search history.

(56) References Cited

U.S. PATENT DOCUMENTS

2018/0035332 A1\*  2/2018  Agiwal ................. H04J 11/003

OTHER PUBLICATIONS

Partial International Search Report—PCT/US2018/023833—ISA/EPO—Jun. 13, 2018.
(Continued)

*Primary Examiner* — Jamal Javaid
*Assistant Examiner* — Thad N Defauw
(74) *Attorney, Agent, or Firm* — Linda G. Gunderson; Patterson & Sheridan LLP

(57) ABSTRACT

Certain aspects of the present disclosure provide techniques for a slot format indicator (SFI) and slot aggregation level indication in a group common physical downlink control channel (GC PDCCH) and conflict handling for the SFI. According to certain aspects, a method of wireless communication by a base station (BS) is provided. The BS can determine a slot aggregation level and a format of the aggregated slots and send a downlink control channel including a SFI indicating the format of the aggregated slot and an indication of the slot aggregation level. The UE can receive the downlink control channel including the SFI and the indication of the slot aggregation level and the UE can determine a format of a current slot based on the received SFI and slot aggregation level.

33 Claims, 10 Drawing Sheets

(56) References Cited

OTHER PUBLICATIONS

Ericsson: "On 'PCFICH-like' Channels", 3GPP draft; R1-1701121, On PCFISCH-like Channels, 3rd Generation Partnership Project (3GPP), Mobile Competence Centre; 650, Route Des Lucioles; F-06921 Sophia-Antipolis Cedex; France, vol. RAN WG1, Spokane, USA; Jan. 16, 2017-Jan. 20, 2017, Jan. 16, 2017 (Jan. 16, 2017), XP051208635, 3 pages, Retrieved from the Internet: URL: http://www.3gpp.org/ftp/Meetings_3GPP_SYNC/RAN1/Docs/ [Retrieved on Jan. 16, 2017].

Intel Corporation: "Group Common PDCCH", 3GPP Draft; R1-1702219, Group Common PDCCH, 3rd Generation Partnership Project (3GPP), Mobile Competence Centre; 650, Route Des Lucioles; F-06921 Sophia-Antipolis Cedex; France, vol. RAN WG1, Athens, Greece; Feb. 13, 2017-Feb. 17, 2017, Feb. 12, 2017 (Feb. 12, 2017), XP051209377, 4 pages, Retrieved from the Internet: URL: http://www.3gpp.org/ftp/Meetings_3GPP SYNC/RAN1/Docs/ [retrieved on Feb. 12, 2017].

Qualcomm Incorporated: "Contents of Group Common PDCCH," 3GPP Draft; R1-1705604, Contents of Group Common PDCCH, 3rd Generation Partnership Project (3GPP), Mobile Competence Centre; 650, Route Des Lucioles; F-06921, Sophia-Antipolis Cedex; France, vol. RAN WG1, Spokane. WA, USA; Apr. 3, 2017-Apr. 7, 2017, Mar. 25, 2017 (Mar. 25, 2017), XP051252038, 6 pages, Retrieved from the Internet: URL: http://www.3gpp.org/ftp/tsg_ran/WG1_RL1/TSGR1_88b/Docs/ [retrieved on Mar. 25, 2017].

International Search Report and Written Opinion—PCT/US2018/023833—ISA/EPO—Aug. 13, 2018.

\* cited by examiner

SLOT FORMAT INDICATOR (SFI) AND SLOT AGGREGATION LEVEL INDICATION IN GROUP COMMON PDCCH AND SFI CONFLICT HANDLING

CROSS-REFERENCE TO RELATED APPLICATION & PRIORITY CLAIM

This application claims benefit of and priority to U.S. Provisional Patent Application Ser. No. 62/476,634, filed Mar. 24, 2017, which is herein incorporated by reference in its entirety for all applicable purposes.

BACKGROUND

Field of the Disclosure

Aspects of the present disclosure relate generally to wireless communications systems, and more particularly, to a slot format indicator (SFI) and slot aggregation level indication in a group common physical downlink control channel (GC PDCCH) and conflict handling for the SFI in certain systems, such as new radio (NR) systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In an LTE or LTE-A network, a set of one or more BSs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NB (gNB), TRP, etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to a slot format indicator (SFI) and slot aggregation level indication in a group common physical downlink control channel (GC PDCCH) and conflict handling for the SFI in certain systems, such as new radio (NR) systems.

Certain aspects of the present disclosure provide a method for wireless communication that may be performed, for example, by a user equipment (UE). The method generally includes receiving a downlink control channel carrying a SFI that indicates whether one or more symbols in a least a current slot are for uplink or for downlink. The method includes determining a scheduled transmission that conflicts with the SFI. The method includes determining a direction of the one or more symbols as uplink or downlink based on the received SFI or based on a direction of the scheduled transmission. The method includes transmitting or receiving in the one or more symbols based on the determined direction for the one or more symbols.

Certain aspects of the present disclosure provide an apparatus for wireless communication, such as a UE. The apparatus generally includes means for receiving a downlink control channel carrying a SFI that indicates whether one or more symbols in a least a current slot are for uplink or for downlink. The apparatus includes means for determining a scheduled transmission that conflicts with the SFI. The apparatus includes means for determining a direction of the one or more symbols as uplink or downlink based on the received SFI or based on a direction of the scheduled transmission. The apparatus includes means for transmitting or receiving in the one or more symbols based on the determined direction for the one or more symbols.

Certain aspects of the present disclosure provide an apparatus for wireless communication, such as a UE. The apparatus generally includes a transceiver configured to receive a downlink control channel carrying a SFI that indicates whether one or more symbols in a least a current slot are for uplink or for downlink. The apparatus includes at least one processor coupled with a memory and configured to determine a scheduled transmission that conflicts with the SFI. The at least one processor is further configured to determine a direction of the one or more symbols as uplink or downlink based on the received SFI or based on a direction of the scheduled transmission. The transceiver is further configured to transmit or receive in the one or more symbols based on the determined direction for the one or more symbols.

Certain aspects of the present disclosure provide a computer readable medium having computer executable code stored thereon for wireless communications. The computer executable code generally includes code for receiving a downlink control channel carrying a SFI that indicates whether one or more symbols in a least a current slot are for uplink or for downlink. The computer executable code includes code for determining a scheduled transmission that conflicts with the SFI. The computer executable code includes code for determining a direction of the one or more symbols as uplink or downlink based on the received SFI or based on a direction of the scheduled transmission. The computer executable code includes code for transmitting or receiving in the one or more symbols based on the determined direction for the one or more symbols.

Certain aspects of the present disclosure provide a method for wireless communication that may be performed, for example, by a base station (BS). The method generally includes determining a slot aggregation level and a format of the aggregated slots. The method includes sending a downlink control channel including a SFI indicating the format of the aggregated slot and an indication of the slot aggregation level.

Certain aspects of the present disclosure provide a method for wireless communication that may be performed, for example, by UE. The method generally includes receiving a downlink control channel including a SFI and an indication of a slot aggregation level. The method includes determining a format of a current slot based on the received SFI and the slot aggregation level.

Certain aspects of the present disclosure provide an apparatus for wireless communication by a BS. The apparatus generally includes means for determining a slot aggregation level and a format of the aggregated slots. The apparatus includes means for sending a downlink control channel including a SFI indicating the format of the aggregated slot and an indication of the slot aggregation level.

Certain aspects of the present disclosure provide an apparatus for wireless communication by a UE. The apparatus generally includes means for receiving a downlink control channel including a SFI and an indication of a slot aggregation level. The apparatus includes means for determining a format of a current slot based on the received SFI and the slot aggregation level.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
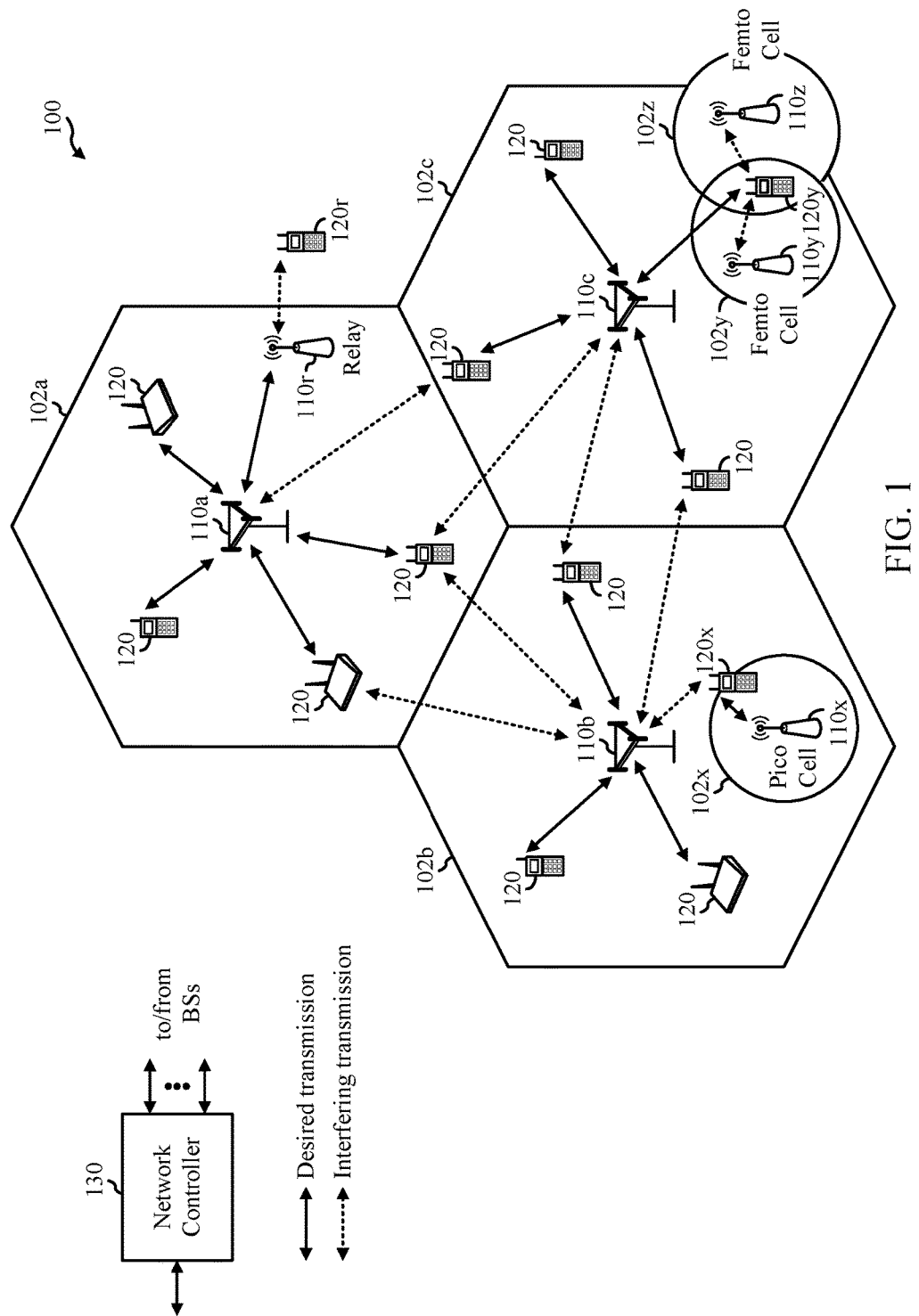
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access or 5G technology). NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In NR, slots, and symbols within slots, may take various configurations, such as downlink, uplink, empty, reserved (e.g., for data only or control only), etc. A slot format indicator (SFI) may carry information that indicates the format of a current slot (and/or a future slot). The SFI may be carried in a downlink region of a slot, for example in a downlink control channel such as the group common physical downlink control channel (GC PDCCH). In NR, slots can be aggregated (referred to as an aggregated slot). In some examples, an aggregated slot has control regions (uplink and/or downlink) in the middle. In this case, the SFI can be sent for each slot. However, in some cases, there is only a downlink control region at the beginning of the aggregated slot. In this case, it is desirable for the user equipment (UE) to have some information about the aggregation level.

In addition, in some cases the SFI may conflict with other scheduled transmissions, such as grants or ACK/NACK (acknowledgement/negative acknowledgement) timing in downlink control information (DCI) or periodic signaling. Thus, techniques for conflict handling/resolution for SFI and other transmissions are desirable.

Aspects of the present disclosure provide techniques and apparatus for SFI and aggregation level indication in the downlink control channel and for SFI conflict handling.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless communication network 100 may be a new radio (NR) or 5G network. As illustrated in FIG. 1, the wireless network 100 may include a number of base stations (BSs) 110 and user equipment (UE) 120. A BS 110 in wireless communication network 100 can determine a slot aggregation level and a format of the aggregated slots and send the UE 120 a slot format indicator (SFI) indicating the format of the aggregated slot in the downlink control channel (e.g., in a group common physical downlink control channel (GC PDCCH)). In addition, the BS can send the UE 120 an indication of the slot aggregation level in the downlink control channel. The UE 120 can receive the downlink control channel including the SFI and the indication of a slot aggregation level and determine a format of a current slot based on the received SFI and slot aggregation level. The BS 110 may send downlink control information (DCI) including an uplink or downlink grant or ACK/NACK timing information that conflicts with the SFI. Also, the BS 110 and/or the UE 120 may be configured with uplink or downlink periodic signaling that may conflict the SFI. The UE 120 may determine whether to follow the SFI, DCI, or periodic signaling for the symbols in the slots.

A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NB (gNB), BS, NR BS, BS, transmission reception point (TRP), etc., may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types (e.g., macro BS, pico BS, femto BS, relays, etc.). These different types of BSs may have different transmit power levels, different coverage areas, and different impact on interference in the wireless communication network 100. For example, a macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity, scheduling resources for one or more subordinate entities (e.g., one or more other UEs), and the other UEs utilize resources scheduled by the UE for wireless communication. A UE may function as a scheduling entity in a peer-to-peer (P2P) network, and/or in a mesh network. In a mesh network example, UEs may communicate directly with one another in addition to communicating with the scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
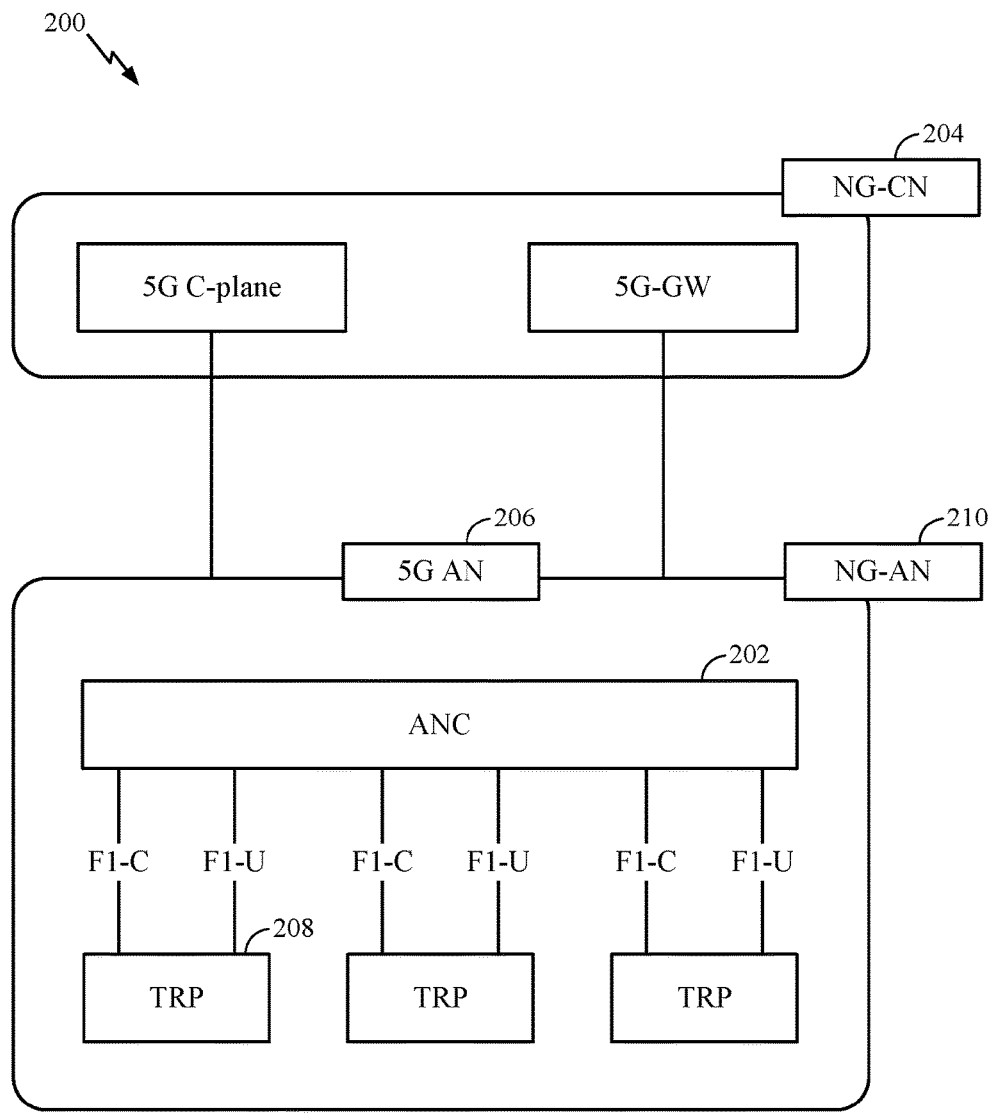
FIG. 2 is a block diagram illustrating an example logical architecture of a distributed radio access network (RAN), in accordance with certain aspects of the present disclosure.

FIG. 2 illustrates an example logical architecture of a distributed RAN 200, which may be implemented in the wireless communication network 100 illustrated in FIG. 1. A 5G access node 206 may include an access node controller (ANC) 202. ANC 202 may be a CU of the distributed RAN 200. The backhaul interface to the next generation core network (NG-CN) 204 may terminate at ANC 202. The backhaul interface to neighboring next generation access nodes (NG-ANs) 210 may terminate at ANC 202. ANC 202 may include one or more TRPs 208 (e.g., cells, BSs, gNBs, etc.). The TRPs 208 may be a DU. The TRPs 208 may be connected to a single ANC (e.g., ANC 202) or more than one ANC (not illustrated). For example, for RAN sharing, radio as a service (RaaS), and service specific AND deployments, the TRPs 208 may be connected to more than one ANC. A TRPs 208 may include one or more antenna ports. The TRPs 208 may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter). The local architecture of the distributed RAN 200 may share features and/or components with LTE. NG-AN 210 may support dual connectivity with NR and may share a common fronthaul for LTE and NR. The logical architecture of the distributed RAN 200 may enable cooperation between and among TRPs 208, for example, within a TRP and/or across TRPs via the ANC 202. An inter-TRP interface may not be used.

Logical functions may be dynamically distributed in the logical architecture of the distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., the TRP 208) or CU (e.g., the ANC 202).

Figure 3:
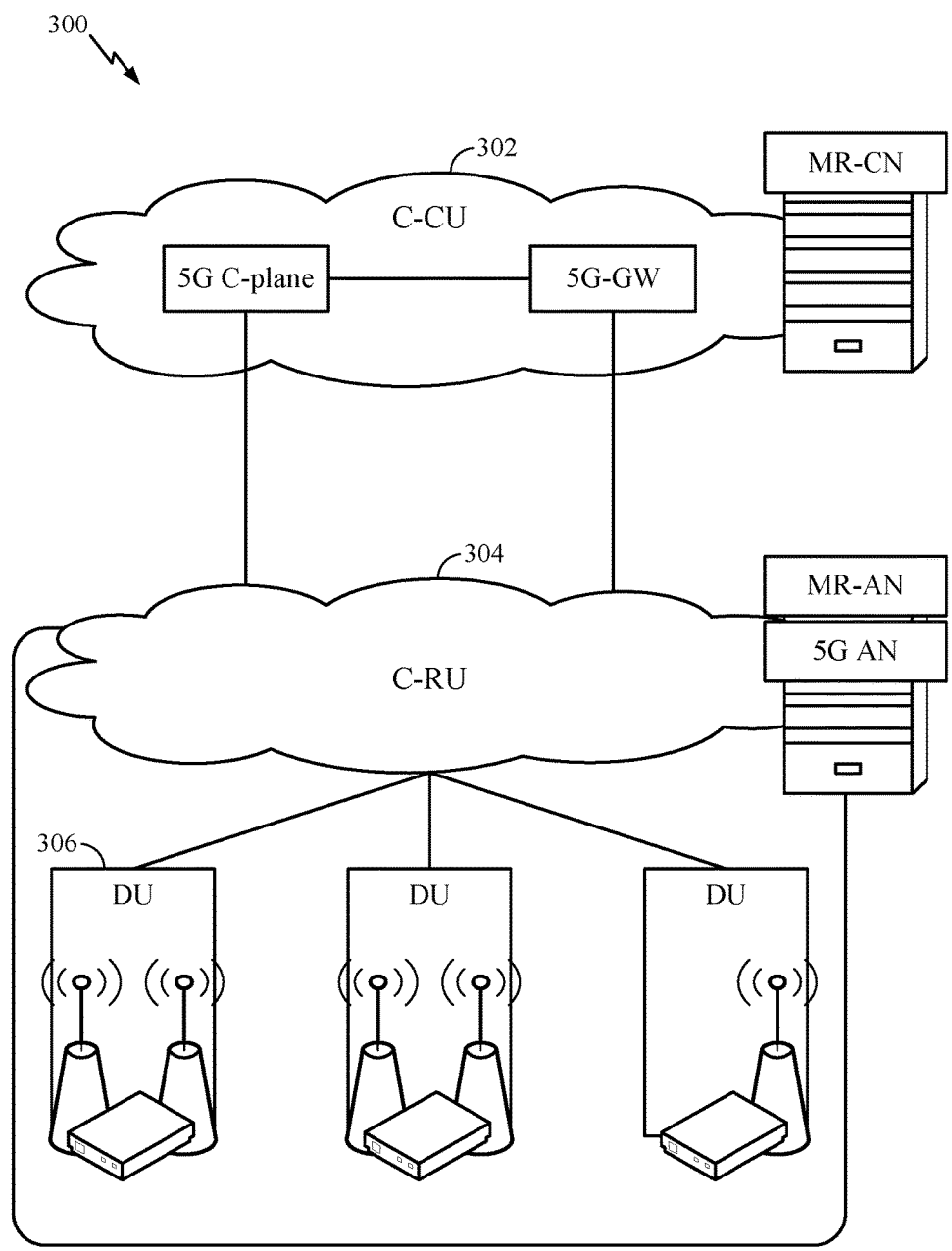
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. C-RU 304 may host core network functions locally. C-RU 304 may have distributed deployment. C-RU 304 may be located near the network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
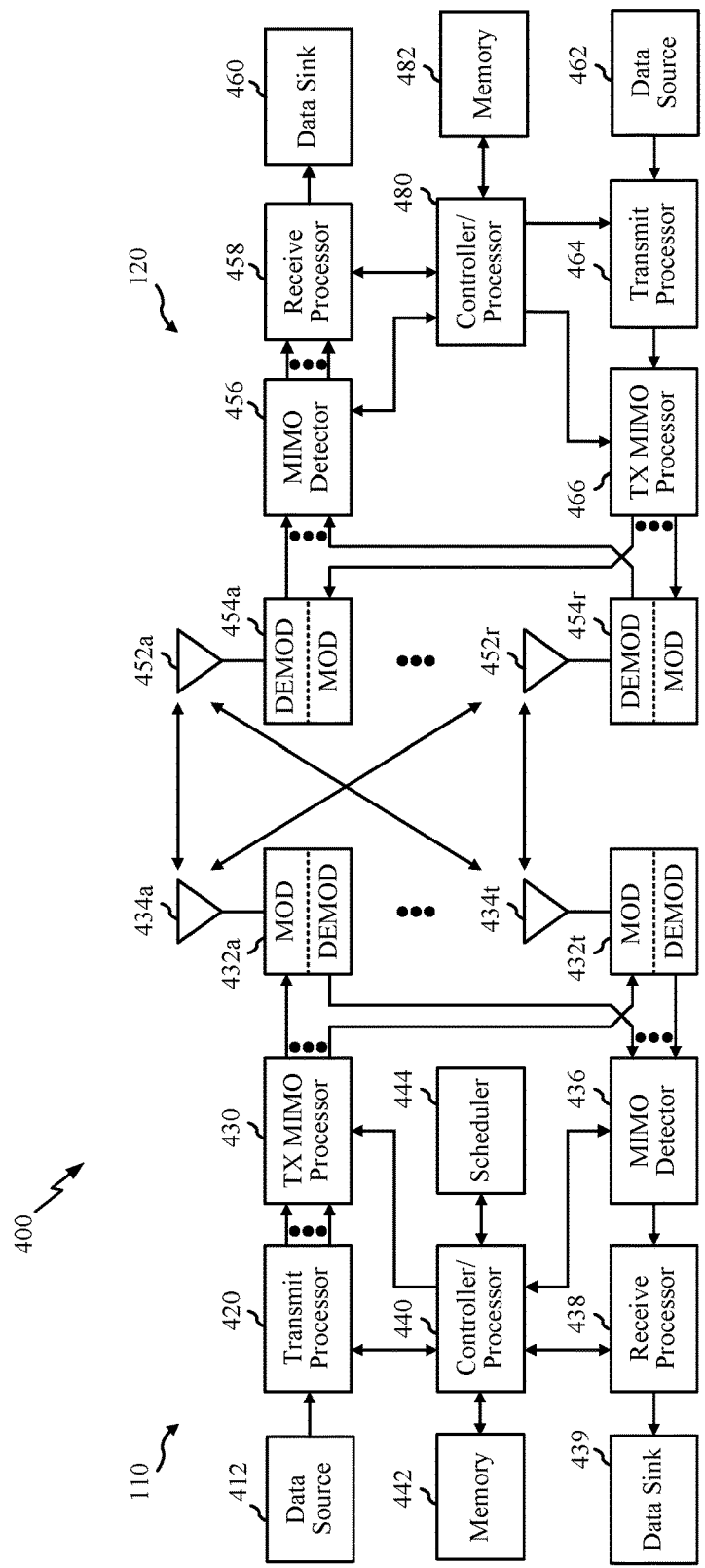
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9 and 10.

At BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared Channel (PDSCH), etc. For example, according to certain aspects of the present disclosure the BS 110 can send a slot format indicator (SFI), slot aggregation level information, and/or downlink control information (DCI) in a downlink control region. The processor 420 may process (e.g., encode and symbol map) the data and control information to obtain data symbols and control symbols, respectively. The processor 420 may also generate reference symbols, such as primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At UE 120, the antennas 452a through 452r may receive the downlink signals from BS 110 and may provide received signals to the demodulators (DEMODs) 454a through 454r, respectively. For example, according to certain aspects of the present disclosure the UE 120 can receive a slot format indicator (SFI), slot aggregation level information, and/or downlink control information (DCI) from the BS 110 in a downlink control region. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators 454a through 454r (e.g., for SC-FDM, etc.), and transmitted to BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at BS 110 and UE 120, respectively. The processor 440 and/or other processors and modules at the base station 110 may perform or direct, e.g., the execution of various processes for the techniques described herein. The processor 480 and/or other processors and modules at the UE 120 may also perform or direct, such as the execution of the functional blocks illustrated in FIG. 10, and/or other processes for the techniques described herein. For example, according to certain aspects of the present disclosure, processors of the UE 120 can determine a direction for one or more symbols in at least a current slot based on the SFI, DCI, and/or slot aggregation information received from the BS 110 and/or based on periodic signaling. The processor 440 and/or other processors and modules at the BS 110 may also perform or direct, such as the execution of the functional blocks illustrated in FIG. 9, and/or other processes for the techniques described herein. The memories 442 and 482 may store data and program codes for BS 110 and UE 120, respectively. A scheduler 444 may schedule UEs for data transmission on the downlink and/or uplink.

Figure 5:
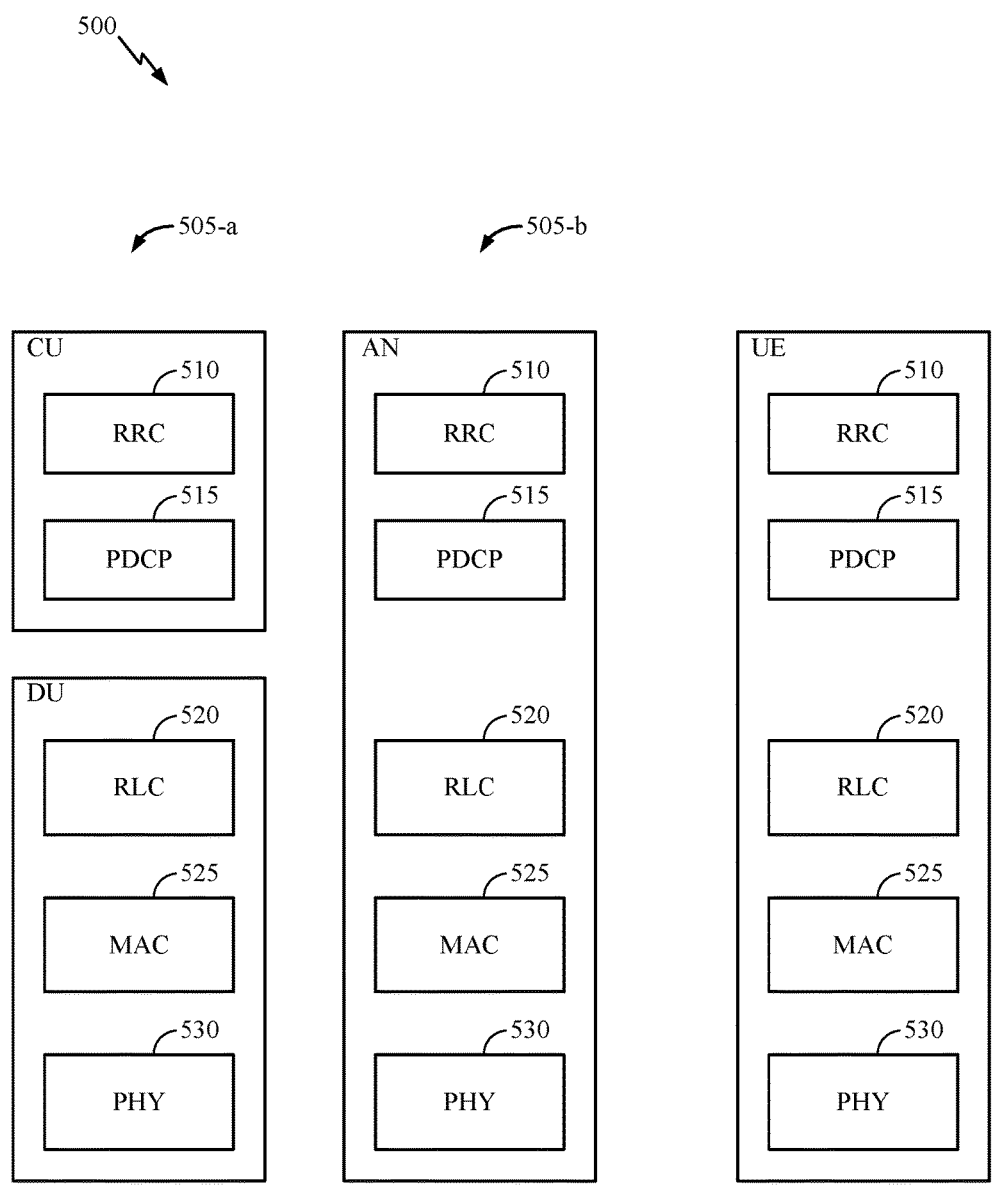
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. Layers of the protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
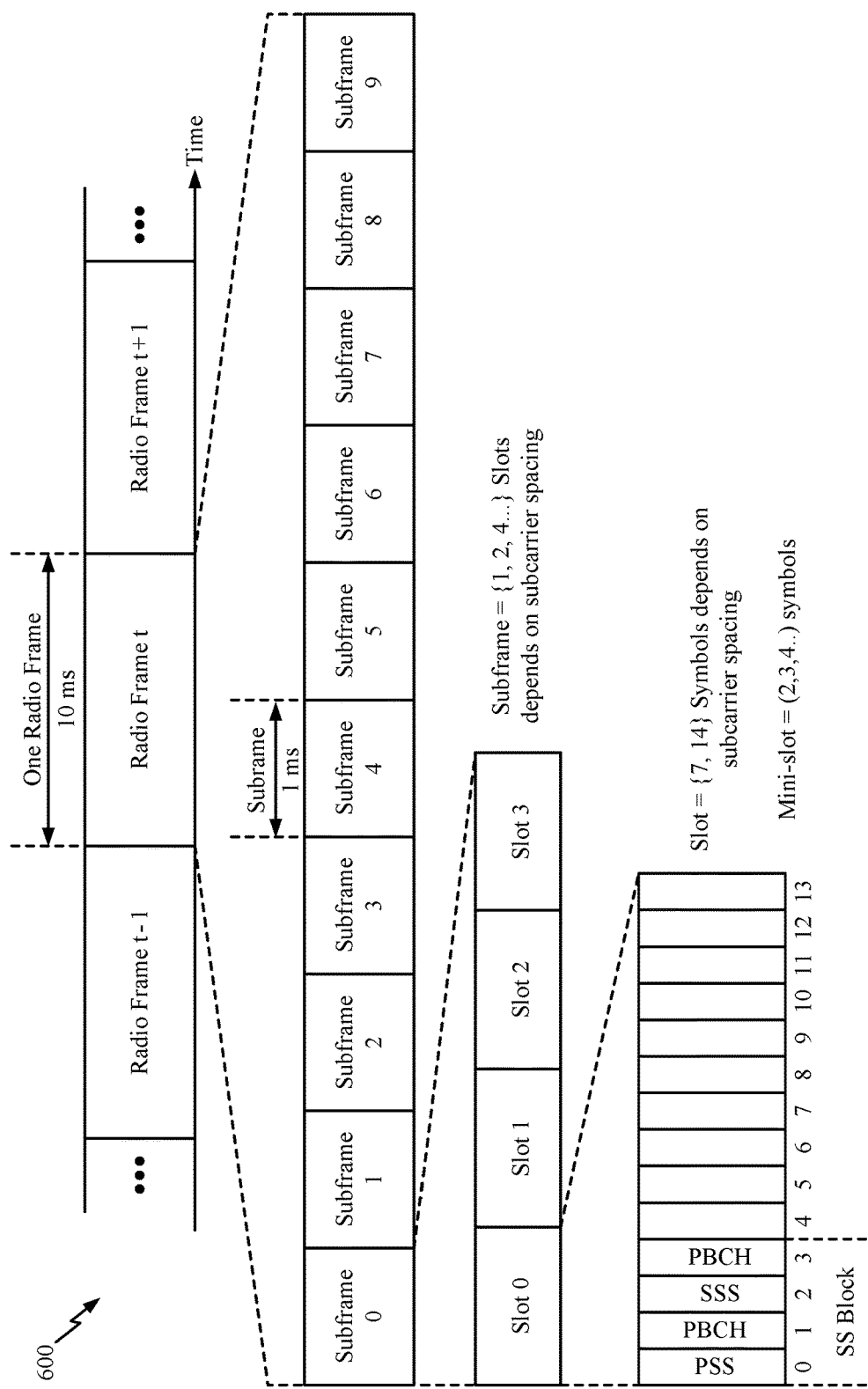
FIG. 6 illustrates an example frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., a UE) to another subordinate entity (e.g., another UE) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example SFI and Slot Aggregation Level Indication in GC PDCCH and SFI Conflict Handling In NR, slots may take various configurations. For example, based on the slot format, the symbols in the slot may have different configurations, such as downlink, uplink, empty (e.g., empty data region), reserved (e.g., forced discontinuous transmission (DTX) or discontinuous reception (DRX) in data region only, control only, or data and control, etc.), etc.

The base station (BS), such as a BS 110 in the wireless communication network 100 illustrated in FIG. 1, can send information to a user equipment (UE) (e.g., a UE 120) regarding the slot format in a downlink control region. For example, the BS can send the information to the UE in a downlink control channel, such as the group common (GC) physical downlink control channel (PDCCH). The GC PDCCH refers to a channel, for example a PDCCH, that carries information, such as a slot format indicator (SFI) via common downlink control information (DCI), intended for a group of UEs. The UEs may be radio resource control (RRC) configured to decode the GC PDCCH. A SFI indicates the format of a current slot and/or future slot(s). The UE can use the information in the SFI to determine (identify, derive, etc.) which symbols in a slot are for uplink or downlink, or other purposes (e.g., such as sidelink, blank, or reserved).

Figure 7:
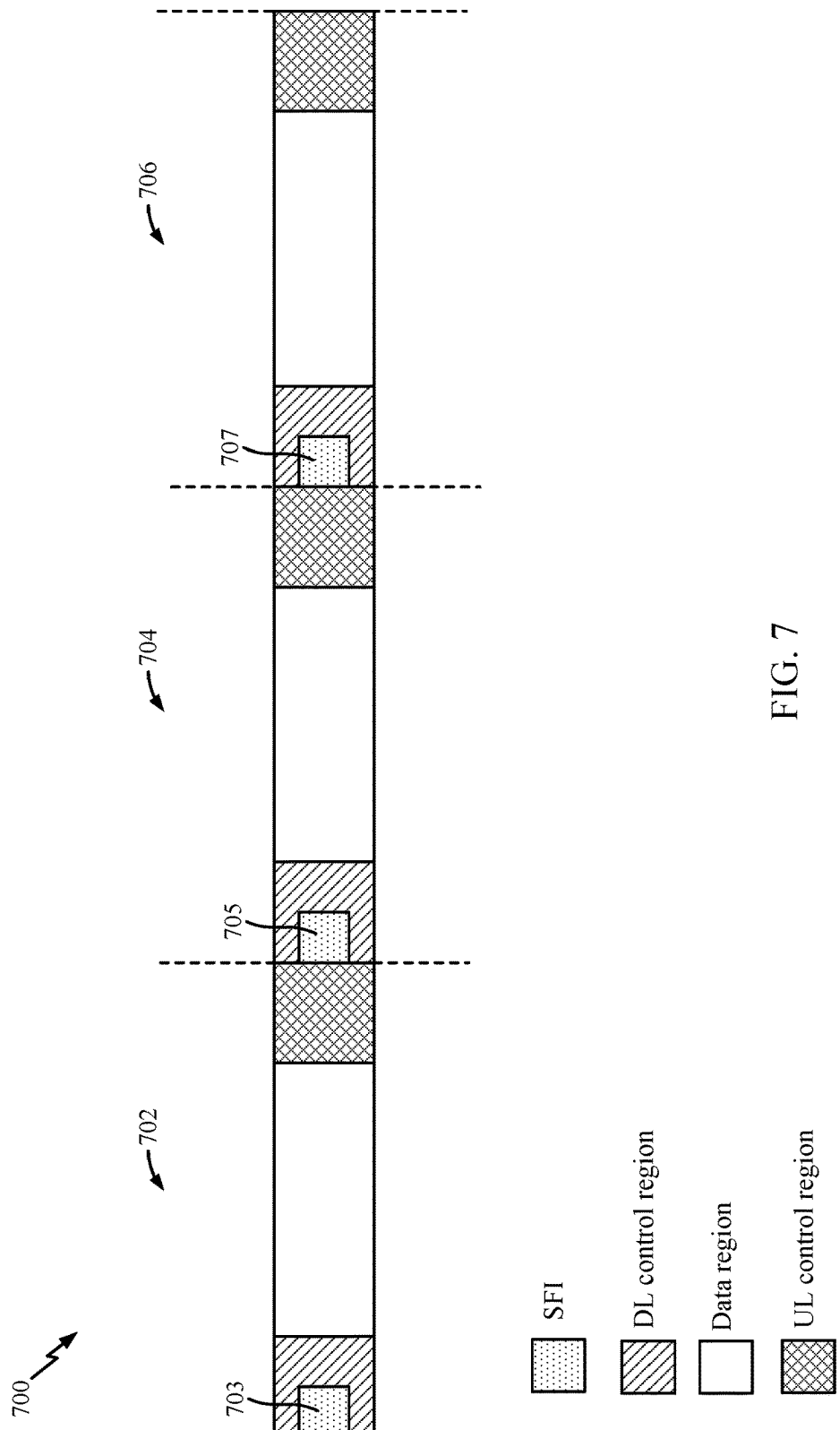
FIG. 7 is an example aggregated slot with a slot format indicator (SFI) in each slot, in accordance with certain aspects of the present disclosure.
Figure 8:
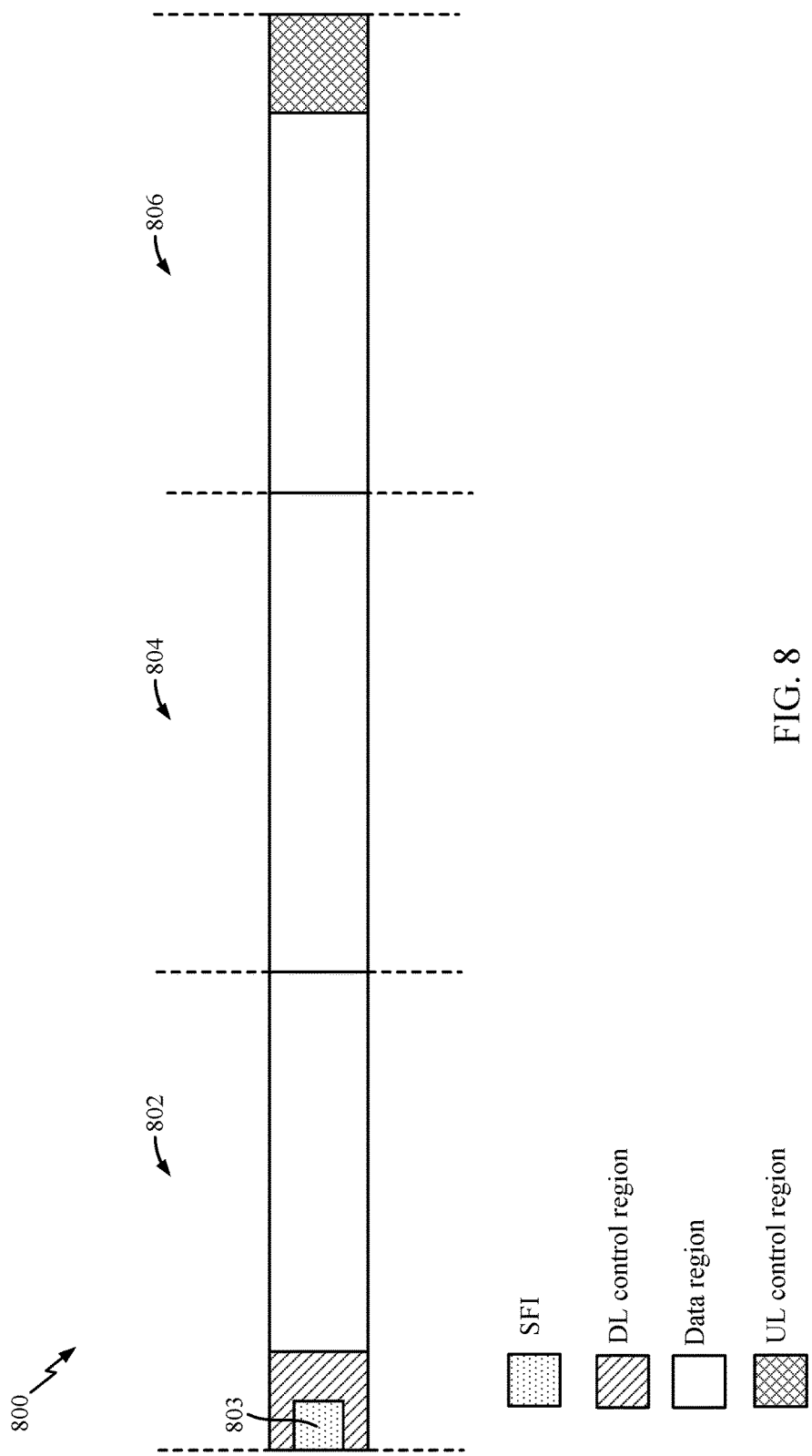
FIG. 8 is an example aggregated slot with SFI only in the first slot, in accordance with certain aspects of the present disclosure.

In NR, slots may be aggregated. The number of aggregated slots is based on the slot aggregation level. For slot aggregation, it may be desirable to include additional information, such as format information for multiple slots (current and future slots). FIG. 7 illustrated an aggregated slot 700 that has control regions (uplink and/or downlink) in the middle. In the aggregated slot 700 shown in FIG. 7, the slots 702, 704, and 706 each have a downlink control region at the beginning and an uplink control region at the end. Thus, the SFI 703, 705, 707 can be sent in the downlink control region of each slot 702, 704, 706, respectively. However, in some cases with slot aggregation, there is only a downlink control region at the beginning of the aggregated slot. As shown in FIG. 8, the aggregated slot 800 has a downlink control region in the first slot 802, in which SFI 803 can be sent, and an uplink control region at the end of slot 806 and no control regions in the middle slot 804. Thus, special handling may be desirable to indicate the format for the aggregated slots.

In addition, as will described in more detail below, SFI may conflict with other scheduled transmissions, such as those scheduled by a grant (uplink and/or downlink) in downlink control information (DCI), ACK/NACK timing (e.g., timing for providing ACK/NACK feedback or a retransmission for HARQ), and/or periodic signaling (uplink or downlink). For example, the SFI may indicate certain symbols as for uplink, downlink, empty, or reserved, while a scheduled transmission for that symbol may be in the other direction. Accordingly, techniques SFI conflict handling/resolution are also desirable.

Aspects of the present disclosure provide techniques and apparatus for SFI and aggregation level indication in the downlink control channel, as well as techniques (e.g., rules) for handling conflict between SFI and other signaling.

Figure 9:
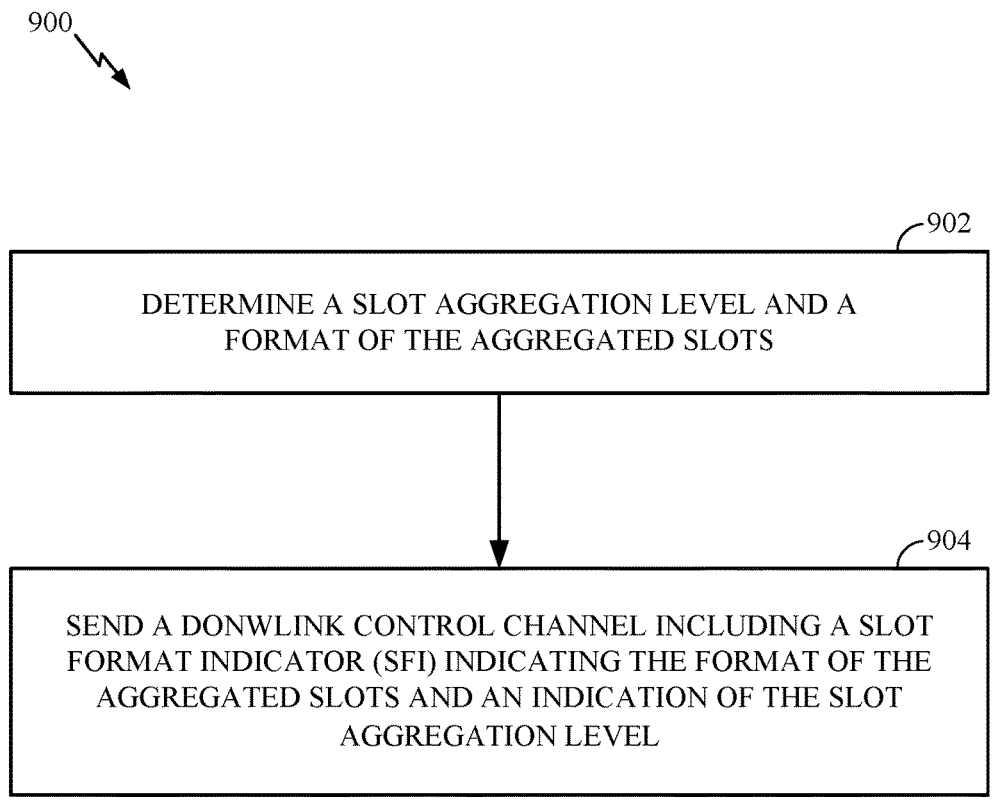
FIG. 9 is a flow diagram illustrating example operations that may be performed by a BS for wireless communication, in accordance with certain aspects of the present disclosure.

FIG. 9 is a flow diagram illustrating example operations 900 for SFI and slot aggregation indication, in accordance with certain aspects of the present disclosure. Operations 900 may be performed, for example, by a BS (e.g., such as a BS 110). Operations 900 may begin, at 900, by determining a slot aggregation level and a format of the aggregated slots. At 904, the BS sends a downlink control channel (e.g., GC PDCCH) including a SFI indicating the format of the aggregated slot and an indication of the slot aggregation level.

Figure 10:
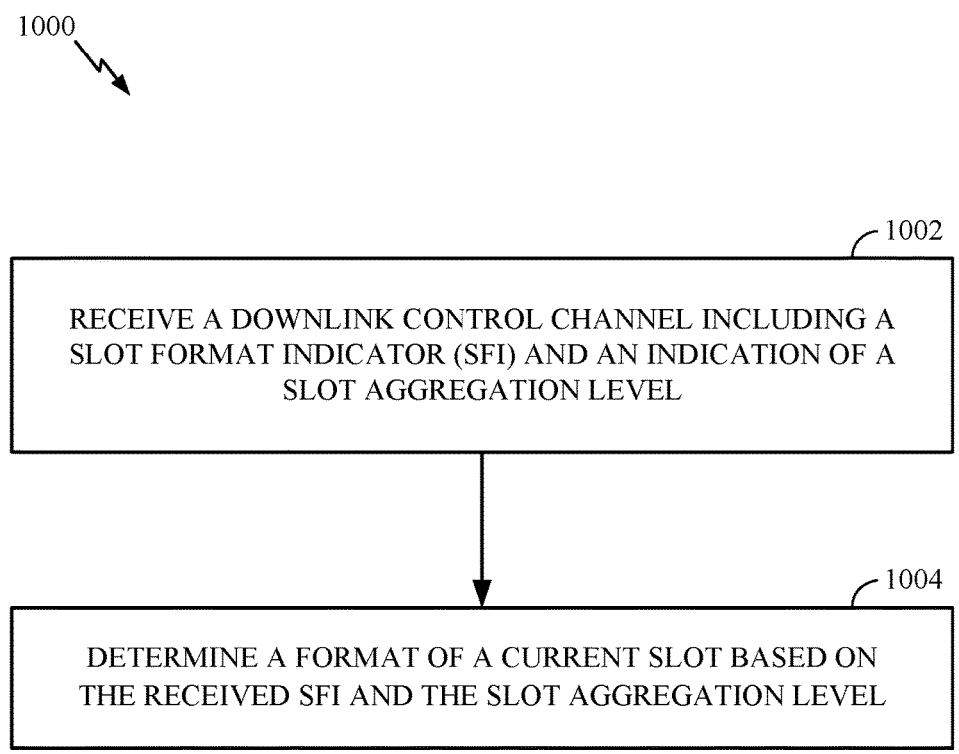
FIG. 10 is a flow diagram illustrating example operations that may be performed by a UE for wireless communication, in accordance with certain aspects of the present disclosure.

FIG. 10 is a flow diagram illustrating example operations 1000 for determining a format of aggregated slots, in accordance with certain aspects of the present disclosure. Operations 1000 may be performed, for example, by a UE (e.g., such as a UE 120). Operations 1000 may be complementary operations by the UE to the operations 900 performed by the BS. Operations 1000 may begin, at 1002, by receiving the downlink control channel including the SFI and the indication of the slot aggregation level. At 1004, the UE determines a format of a current slot (e.g., determine a direction to apply for the symbols in the slot) based on the received SFI and the slot aggregation level. In aspects, the UE can determine the format of one or more future slots as well based on the received SFI and the slot aggregation level. For example, the UE can determine the format of each of the aggregated slots.

According to certain aspects, in the case that aggregated slot does not have control regions in the middle, for example, as shown in FIG. 8, then it may be desirable to include additional information in the downlink control channel (e.g., in the GC PDCCH) in addition to the information in the SFI. For example, the aggregation level of the slot (e.g., which indicates the number of aggregated slots) may be indicated in the downlink control channel (e.g., in separate fields) at the beginning of the aggregated slot.

The UE receiving the downlink control channel may be able to use the information, including the SFI and the aggregation level, to determine (derive, identify, etc.) the format of a current slot and/or future slots, such as which symbols in the slot are for uplink and which symbols are for downlink. In aspects, the UE can skip PDCCH decoding during aggregated slots.

Example Handling of SFI Conflict with Other Signals

It may be desirable that information in the SFI does not conflict with other signaling, such as downlink control information (DCI) (e.g., uplink grants, downlink grants, and/or ACK/NACK timing) and pre-configured periodic uplink or downlink transmissions. There can be false detection with GC PDCCH. For example, the DCI can schedule an uplink or downlink transmission (or there can be a periodic uplink or downlink transmission) in a symbol, while the SFI may indicate that symbol as non-uplink (e.g., downlink, reserved, empty, etc.) or non-downlink (e.g., uplink, reserved, empty, etc.).

In an example scenario, information in the SFI may indicate that one or more symbols are for either uplink or downlink (or reserved, empty, etc.); however, a grant in the DCI and/or ACK/NACK timing information in the DCI may schedule a UE for transmitting or receiving a transmission in the other direction in one of those symbols. There also can be detection error either in DCI or SFI. Thus, the SFI and DCI can conflict. If the UE determines that there is a conflict, the UE may give priority to either the information in the SFI or the information in the DCI. In one example, the UE always gives priority to the information in the DCI. Alternatively, the UE may only give priority to a DCI received in the current slot, but if the DCI was received in a previous slot, then the UE may give priority to the information in the SFI.

In another example scenario, information in the SFI may conflict with periodic signaling. On downlink, periodic signaling may include such signaling as channel state information reference signals (CSI-RS), synchronization signals (primary synchronization signal (PSS), secondary synchronization signal (SSS), and/or physical broadcast channel (PBCH)), and/or semi-persistent scheduling (SPS). On the uplink, periodic signaling may include sounding reference signal (SRS), physical uplink control channel (PUCCH)

with channel state information (CSI), and/or SPS. Information in the SFI may indicate that one or more symbols are for either uplink or downlink (or reserved, empty, etc.); while some periodic signal may occur in the other directions in those symbols. Thus, the SFI and periodic signaling conflict. If the UE determines that there is a conflict, the UE may give priority to either the information in the SFI or the periodic signaling.

In one example, if there is DCI information for the symbol, the UE always gives priority to the information in the DCI. Alternatively, if there is DCI information for the symbol, the UE may only give priority to the information in the DCI if the DCI is received in the current slot—not to DCI received in a previous slot. If DCI is not present (or does not include a grant for that symbol), and if the SFI indicates a direction, the UE gives priority to the information in the SFI. If DCI is not present and the SFI indicates empty, the UE gives priority to the periodic signaling. And if DCI is not present and the SFI indicates reserved, the UE gives priority to the SFI.

Giving priority to the information in the DCI may include transmitting or monitoring for a transmission based on an uplink or downlink grant in the DCI (e.g., ignoring the link direction indicated by the SFI) or based on the ACK/NACK timing in the DCI. Giving priority to the SFI may include ignoring the uplink or downlink grant or ACK/NACK timing in the DCI if it conflicts with the information in the SFI. Giving priority to the periodic signaling may include transmitting or monitoring for the periodic signaling regardless of the information in the SFI or DCI.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
 receiving a downlink control channel carrying a slot format indicator (SFI) that indicates whether one or more symbols in at least a current slot are for uplink or for downlink;
 determining a scheduled transmission that conflicts with the SFI;
 determining a direction of the one or more symbols as uplink or downlink based on the received SFI or based on a direction of the scheduled transmission; and
 transmitting or receiving in the one or more symbols based on the determined direction for the one or more symbols.

2. The method of claim 1, wherein the downlink control channel comprises a group common physical downlink control channel (GC PDCCH).

3. The method of claim 1, wherein:
 the transmission is scheduled by a received downlink control information (DCI); and
 determining the direction of the one or more symbols comprises giving priority to the direction of the transmission scheduled by the DCI.

4. The method of claim 1, wherein:
 the transmission is scheduled by a received downlink control information (DCI); and
 determining the direction of the one or more symbols comprises:
  giving priority to the SFI if the DCI was received in a previous slot, and
  giving priority to the DCI if the DCI was received in the current slot.

5. The method of claim 1, wherein:
 the scheduled transmission comprises at least one of a downlink periodic signal in one of the symbols indicated as uplink, reserved, or empty by the SFI or an uplink periodic signal in one of the symbols indicated as downlink, reserved, or empty by the SFI.

6. The method of claim 3, wherein:
the transmission is scheduled by at least one of a grant in the DCI or ACK/NACK timing information in the DCI scheduling the UE to transmit in a symbol indicated as non-uplink by the SFI or scheduling the UE to receive in a symbol indicated as non-downlink by the SFI.

7. The method of claim 5, wherein the periodic signal comprises at least one of: a channel state information reference signal (CSI-RS), a primary synchronization signal (PSS), a secondary synchronization signal (SSS), a physical broadcast channel (PBCH), semi-persistent scheduling (SPS), a sounding reference signal (SRS), or a physical uplink control channel (PUCCH) carrying channel state information (CSI).

8. The method of claim 5, further comprising:
receiving downlink control information (DCI) containing a grant for the symbol scheduled for the periodic signal, wherein
determining the direction of the one or more symbols comprises determining the direction of the symbol based on the grant in the DCI.

9. The method of claim 5, wherein determining the direction of the one or more symbols comprises determining the direction of the symbol based on the SFI if the SFI indicates a direction for that symbol.

10. The method of claim 5, wherein determining the direction of the one or more symbols comprises determining the direction of the symbol based on the periodic signal if the SFI indicates the symbol as empty.

11. The method of claim 5, wherein determining the direction of the one or more symbols comprises determining the direction of the symbol based on the SFI if the SFI indicates the symbol as reserved.

12. An apparatus for wireless communications, comprising:
means for receiving a downlink control channel carrying a slot format indicator (SFI) that indicates whether one or more symbols in at least a current slot are for uplink or for downlink;
means for determining a scheduled transmission that conflicts with the SFI;
means for determining a direction of the one or more symbols as uplink or downlink based on the received SFI or based on a direction of the scheduled transmission; and
means for transmitting or receiving in the one or more symbols based on the determined direction for the one or more symbols.

13. The apparatus of claim 12, wherein the downlink control channel comprises a group common physical downlink control channel (GC PDCCH).

14. The apparatus of claim 12, wherein:
the transmission is scheduled by a received downlink control information (DCI); and
means for determining the direction of the one or more symbols comprises means for giving priority to the direction of the transmission scheduled by the DCI.

15. The apparatus of claim 12, wherein:
the transmission is scheduled by a received downlink control information (DCI); and
means for determining the direction of the one or more symbols comprises:
means for giving priority to the SFI if the DCI was received in a previous slot, and
means for giving priority to the DCI if the DCI was received in the current slot.

16. The apparatus of claim 12, wherein:
the scheduled transmission comprises at least one of a downlink periodic signal in one of the symbols indicated as uplink, reserved, or empty by the SFI or an uplink periodic signal in one of the symbols indicated as downlink, reserved, or empty by the SFI.

17. The apparatus of claim 14, wherein:
the transmission is scheduled by at least one of a grant in the DCI or ACK/NACK timing information in the DCI scheduling the UE to transmit in a symbol indicated as non-uplink by the SFI or scheduling the UE to receive in a symbol indicated as non-downlink by the SFI.

18. The apparatus of claim 16, wherein the periodic signal comprises at least one of: a channel state information reference signal (CSI-RS), a primary synchronization signal (PSS), a secondary synchronization signal (SSS), a physical broadcast channel (PBCH), semi-persistent scheduling (SPS), a sounding reference signal (SRS), or a physical uplink control channel (PUCCH) carrying channel state information (CSI).

19. The apparatus of claim 16, further comprising:
means for receiving downlink control information (DCI) containing a grant for the symbol scheduled for the periodic signal, wherein
means for determining the direction of the one or more symbols comprises means for determining the direction of the symbol based on the grant in the DCI.

20. The apparatus of claim 16, wherein means for determining the direction of the one or more symbols comprises means for determining the direction of the symbol based on the SFI if the SFI indicates a direction for that symbol.

21. The apparatus of claim 16, wherein means for determining the direction of the one or more symbols comprises means for determining the direction of the symbol based on the periodic signal if the SFI indicates the symbol as empty.

22. The apparatus of claim 16, wherein means for determining the direction of the one or more symbols comprises means for determining the direction of the symbol based on the SFI if the SFI indicates the symbol as reserved.

23. An apparatus for wireless communications, comprising:
a transceiver configured to receive a downlink control channel carrying a slot format indicator (SFI) that indicates whether one or more symbols in at least a current slot are for uplink or for downlink; and
at least one processor coupled with a memory and configured to:
determine a scheduled transmission that conflicts with the SFI; and
determine a direction of the one or more symbols as uplink or downlink based on the received SFI or based on a direction of the scheduled transmission; wherein
the transceiver is further configured to transmit or receive in the one or more symbols based on the determined direction for the one or more symbols.

24. The apparatus of claim 23, wherein the downlink control channel comprises a group common physical downlink control channel (GC PDCCH).

25. The apparatus of claim 23, wherein:
the transmission is scheduled by a received downlink control information (DCI); and
the at least one processor is configured to determine the direction of the one or more symbols by giving priority to the direction of the transmission scheduled by the DCI.

26. The apparatus of claim 23, wherein:

the transmission is scheduled by a received downlink control information (DCI); and the at least one processor is configured to determine the direction of the one or more symbols by:

giving priority to the SFI if the DCI was received in a previous slot, and giving priority to the DCI if the DCI was received in the current slot.

27. The apparatus of claim 23, wherein:

the scheduled transmission comprises at least one of a downlink periodic signal in one of the symbols indicated as uplink, reserved, or empty by the SFI or an uplink periodic signal in one of the symbols indicated as downlink, reserved, or empty by the SFI.

28. The apparatus of claim 25, wherein:

the transmission is scheduled by at least one of a grant in the DCI or ACK/NACK timing information in the DCI scheduling the UE to transmit in a symbol indicated as non-uplink by the SFI or scheduling the UE to receive in a symbol indicated as non-downlink by the SFI.

29. The apparatus of claim 27, wherein the periodic signal comprises at least one of: a channel state information reference signal (CSI-RS), a primary synchronization signal (PSS), a secondary synchronization signal (SSS), a physical broadcast channel (PBCH), semi-persistent scheduling (SPS), a sounding reference signal (SRS), or a physical uplink control channel (PUCCH) carrying channel state information (CSI).

30. The apparatus of claim 27, wherein:

the transceiver is configured to receive a downlink control information (DCI) containing a grant for the symbol scheduled for the periodic signal, wherein the at least one processor is configured to determine the direction of the symbol based on the grant in the DCI.

31. The apparatus of claim 27, wherein the at least one processor is configured to determine the direction of the one or more symbols by determining the direction of the symbol based on the SFI if the SFI indicates a direction for that symbol.

32. The apparatus of claim 27, wherein the at least one processor is configured to determine the direction of the one or more symbols by determining the direction of the symbol based on the periodic signal if the SFI indicates the symbol as empty.

33. The apparatus of claim 27, wherein the at least one processor is configured to determine the direction of the one or more symbols by determining the direction of the symbol based on the SFI if the SFI indicates the symbol as reserved.

* * * * *